Aug. 7, 1934.  A. E. ERICKSON  1,969,170
DISPENSING MACHINE
Filed Dec. 16, 1932    2 Sheets-Sheet 1
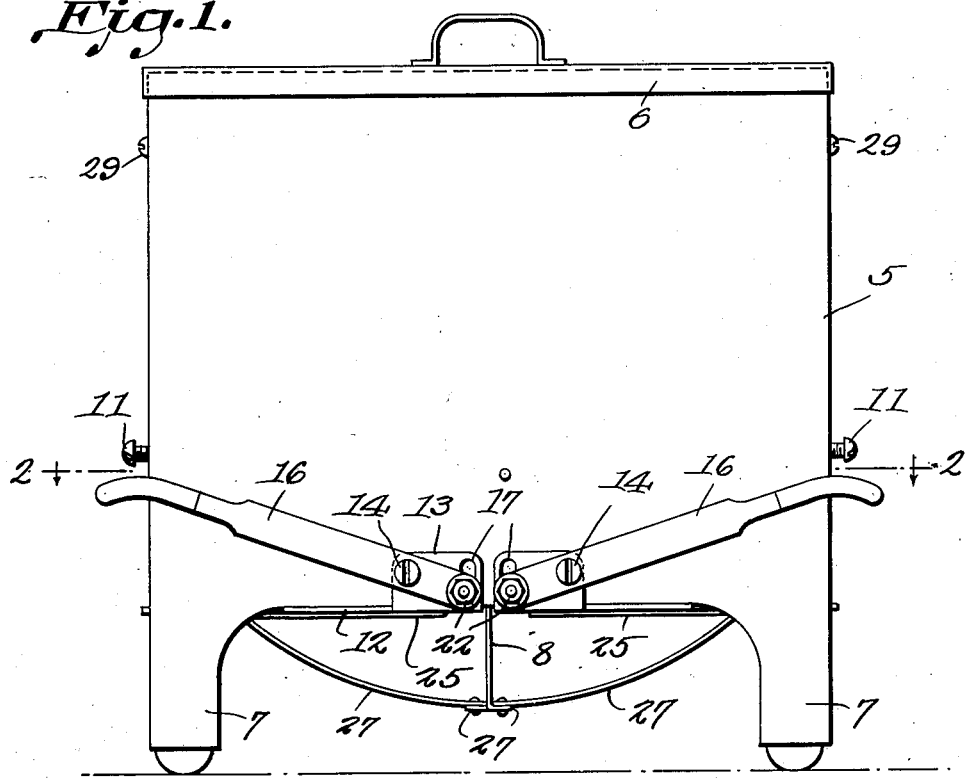
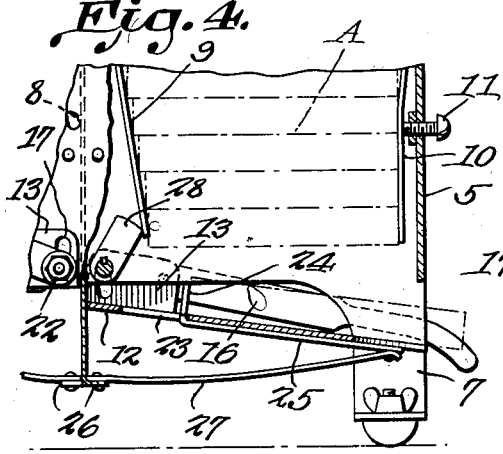
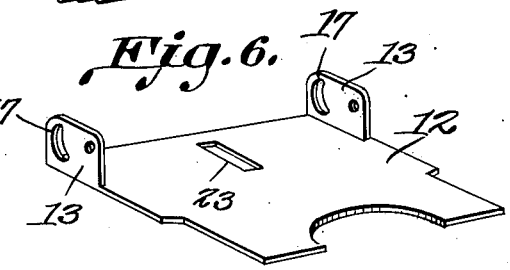
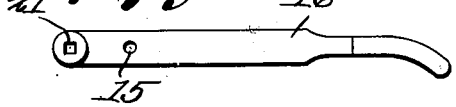
A. E. Erickson, Inventor
By C. A. Snow & Co.
Attorneys Aug. 7, 1934.  A. E. ERICKSON  1,969,170
DISPENSING MACHINE
Filed Dec. 16, 1932   2 Sheets-Sheet 2
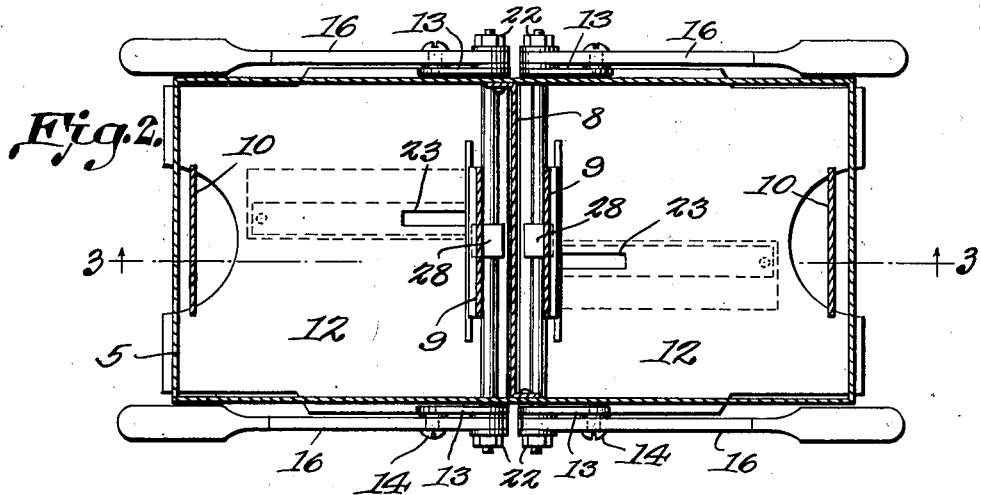
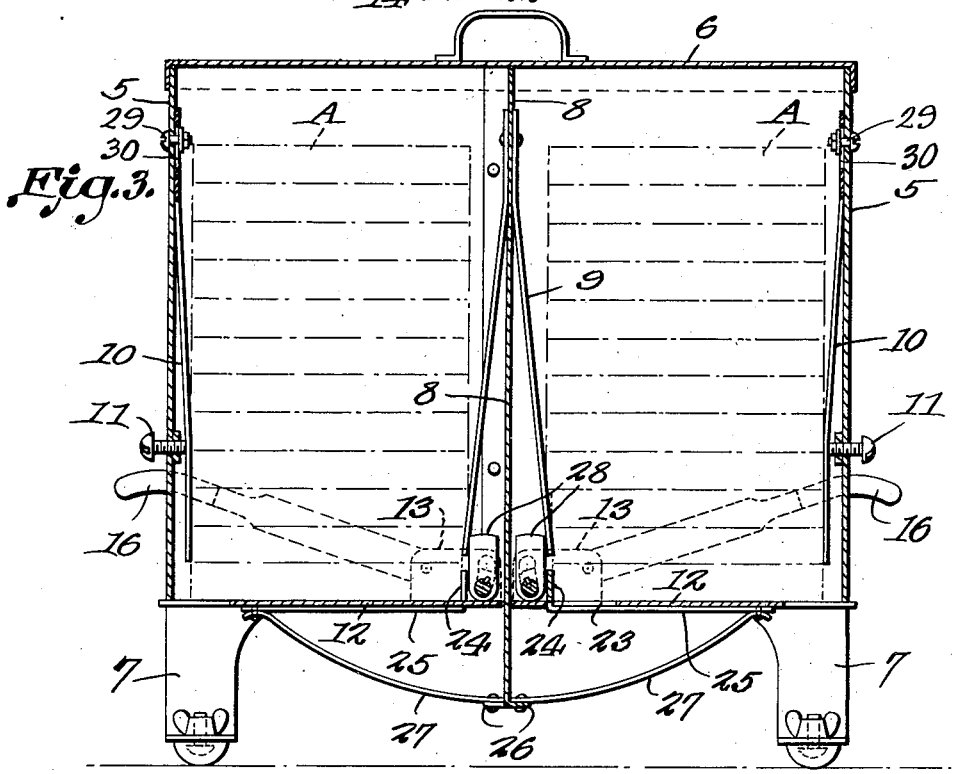
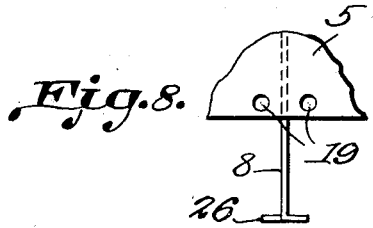
A. E. Erickson, Inventor Patented Aug. 7, 1934

1,969,170

UNITED STATES PATENT OFFICE 1,969,170

DISPENSING MACHINE

Archie E. Erickson, Garret, Ind.

Application December 16, 1932, Serial No. 647,646

3 Claims. (Cl. 312—63)

This invention relates to dispensing cabinets, the primary object of the invention being to provide a cabinet for dispensing slices of bread, facilitating the handling of bread in the making of sandwiches at lunch counters, restaurants or the like.

An important object of the invention is to provide a cabinet of this character which will insure the slices of bread being maintained in a sanitary condition at all times, and one wherein the shape of the slices will not be distorted by the action of the machine.

Another object of the invention is the provision of a cabinet which may be adjusted for use in dispensing slices of various sizes.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a side elevational view of a cabinet constructed in accordance with the invention.

Figure 2 is a sectional view taken on line 2—2 of Figure 1.

Figure 3 is a sectional view taken on line 3—3 of Figure 2.

Figure 4 is a fragmentary sectional view through the lower front wall of the cabinet, illustrating the movable bottom in a discharging position.

Figure 5 is a perspective view of one of the shafts on which the movable bottom members are mounted.

Figure 6 is a perspective view of one of the movable bottom members.

Figure 7 is an elevational view of one of the levers.

Figure 8 is a view illustrating the construction of the support for the springs that operate against the bottom members.

Referring to the drawings in detail, the cabinet comprises a body portion indicated generally by the reference character 5, the body portion being box-like in formation and provided with a cover 6 closing the upper end of the body portion.

The side and front walls of the body portion are formed with depending portions 7 that provide legs for the body portion, supporting the body portion in spaced relation with the surface on which the cabinet is placed.

Disposed within the body portion is a partition 8 that divides the body portion into lateral compartments for the reception of the slices of bread, which are indicated at A.

Secured to each side of the partition 8, is a spring 9, the lower ends of the springs being spaced from the partition 8, to engage the slices of bread at the lower ends of the compartments, to prevent more than one slice being delivered with each operation of the machine.

Springs 10 are secured to the end walls of the body portion, the lower ends of the springs 10 being spaced from their supporting walls, and held in such spaced relation by means of set screws 11, which set screws may be adjusted to regulate the action of the springs 10, and adapt the device for use in connection with slices of various sizes.

Pins 29 secure the springs 10 in position, and pass through slots 30 formed in the springs, so that the springs may be adjusted vertically, adapting the device for use in dispensing slices of various thicknesses, or more than one slice, if desired.

The lower end of each compartment is closed by means of a pivoted bottom plate 12, each plate being provided with upstanding flanges 13 arranged near the inner ends thereof, which flanges are formed with openings to receive screws 14, that also pass through openings 15 in the levers 16, securing the levers to the bottom plates.

These flanges 13 are also formed with elongated curved openings 17 that accommodate the shaft 18 associated therewith. The shafts 18 are positioned in the openings 19 formed in opposite sides of the side walls of the body portion.

As clearly shown by Figure 5 of the drawings, each shaft 18 is formed with squared end portions 20, which squared end portions fit into the squared openings 21 formed in the inner ends of the levers 16, there being provided nuts 22 for securing the levers in position on their shafts.

Each bottom plate 12 is formed with an elongated opening 23 through which the neck of the flange 24 of the sliding plate 25 associated therewith extends, the flange 24 resting on the upper surface of the bottom plate, to slide thereover and eject a slice of bread resting thereagainst.

The partition 8, extends an appreciable distance below the bottom of the body portion, where it is split, providing laterally extended portions 26 that provide supports for the curved spring members 27 that have their outer ends connected to the sliding plates 25.

Thus it will be seen that due to the construction shown and described, the sliding plates 25 are moved outwardly by the action of the springs 27, which flatten when the bottom plates are swung downwardly from a position as shown by Figure 3, to a position as shown by Figure 4.

When the bottom plates are moved to their discharging positions, the outer or free ends thereof move to positions in spaced relation with the lower ends of the front and rear walls of the body portion so that the slices of bread may slide thereunder.

Fingers 28 are keyed to the shafts 18, and are arranged so that they normally extend upwardly, but move forwardly when the shafts are rotated or the levers are forced downwardly.

As these fingers 28 move forwardly, they force the lower end of the spring member 9 associated therewith outwardly, against the slices of bread held in the compartments, thereby restricting downward movement of the slices of bread, to prevent more than one slice of bread being delivered by the machine, at a single operation.

In the use of the device, assuming that the bottom plates are in positions as shown by Figure 3 of the drawings, the levers 16 at one side of the machine are forced downwardly. Upon downward movement of the levers, the bottom plate associated therewith, swings to a position as shown by Figure 4, whereupon the sliding plate of this bottom plate, moves forwardly ejecting a slice of bread through the opening or space between the forward end of the bottom plate and lower end of the wall of the body portion.

The spring 9 of the compartment from which the slices are being dispensed, is moved into close engagement with the lowermost slices of bread preventing more than one slice of bread passing from the cabinet with each operation.

It will, of course, be obvious that when the levers are released, they move into their inactive positions, and the lowermost slice of bread drops onto the bottom plate below the lower ends of the springs of the compartment, to be delivered with the next operation of the levers.

I claim:

1. A cabinet of the class described, comprising a body portion, a partition within the body portion dividing the body portion into lateral compartments, swinging bottom plates normally closing the compartments, sliding plates on the bottom plates and having upstanding flanges engaging articles contained in the body portion, spring members under the bottom plates and secured to the sliding plates to normally urge the bottom plates to their inactive positions, and levers for swinging the bottom plates downwardly to discharge articles therefrom.

2. A cabinet of the class described, comprising a body portion, a pivoted plate normally closing the bottom of the body portion, a shaft on which the pivoted plate is mounted, a spring member extending into the body portion and contacting with articles contained in the body portion, a lever for swinging the plate downwardly, means on the plate for moving articles over the plate, and means mounted on the shaft and engaging the spring to move the spring inwardly against the articles in the cabinet, when the lever is operated.

3. A cabinet of the class described, comprising a body portion, a pivoted plate normally closing the bottom of the body portion, a movable article engaging member on the pivoted plate, a curved spring member disposed under the body portion, one end of the spring member being secured to the movable article engaging member and adapted to move the article engaging member outwardly, ejecting an article when the pivoted plate is swung downwardly, and means for operating the pivoted plate.

ARCHIE E. ERICKSON.